(12) United States Patent
Righi et al.

(10) Patent No.: US 12,393,652 B1
(45) Date of Patent: Aug. 19, 2025

(54) SECURING COMPUTING DEVICES DURING TRANSIT

(71) Applicant: AMERICAN MEGATRENDS INTERNATIONAL, LLC, Duluth, GA (US)

(72) Inventors: Stefano Righi, Lawrenceville (GA); Madhan B. Santharam, Cumming, GA (US); Feng Li, Sugar Hill, GA (US)

(73) Assignee: AMERICAN MEGATRENDS INTERNATIONAL, LLC, Duluth, GA (US)

( * ) Notice: Subject to any disclaimer, the term of this patent is extended or adjusted under 35 U.S.C. 154(b) by 288 days.

(21) Appl. No.: 18/319,393

(22) Filed: May 17, 2023

(51) Int. Cl.
*G06F 21/31* (2013.01)
*G06F 21/44* (2013.01)
*G06F 21/60* (2013.01)

(52) U.S. Cl.
CPC .............. *G06F 21/31* (2013.01); *G06F 21/44* (2013.01); *G06F 21/602* (2013.01)

(58) Field of Classification Search
CPC ......... G06F 21/31; G06F 21/44; G06F 21/602
USPC ........................................................ 713/182
See application file for complete search history.

(56) References Cited

U.S. PATENT DOCUMENTS

| 11,157,626 B1 * | 10/2021 | Ratts | H04L 67/55 |
| 2020/0310662 A1 * | 10/2020 | Staab | G06F 21/44 |

FOREIGN PATENT DOCUMENTS

| KR | 20150007034 A | * | 1/2015 | G06F 21/44 |

* cited by examiner

*Primary Examiner* — Jacob Lipman
(74) *Attorney, Agent, or Firm* — Newport IP, LLC; Leonard J. Hope

(57) ABSTRACT

A computing device is configured with a hardware root of trust ("HRoT"). The HRoT and a remote registration server exchange public keys while the device is in a trusted environment. The device is then locked by setting a lock status in the HRoT. The device can then be shipped to a recipient. When the device is powered on following transit, the HRoT pauses booting of the device. If a request to unlock the device is received, the HRoT provides an encrypted one-time password to the registration server. The registration server decrypts the one-time password and provides the decrypted one-time password to the HRoT. If the HRoT determines that one-time password received from the registration server is identical to the one-time password it generated, the HRoT sets the lock status of the device to unlocked and allows the device to boot.

20 Claims, 9 Drawing Sheets

REGISTRATION PRIOR TO TRANSIT
(PERFORMED IN TRUSTED ENVIRONMENT)

HOST COMPUTER BOOT PROCESS

UNLOCK HOST COMPUTER USING SMARTPHONE

UNLOCK HOST COMPUTER USING BMC

SECURING COMPUTING DEVICES DURING TRANSIT

BACKGROUND

Computing devices manufactured by an original device manufacturer ("ODM") are typically shipped from the ODM's facility to an original equipment manufacturer ("OEM") or directly to end customers. Although ODMs typically implement many types of security mechanisms within new computing devices prior to shipment, such as trusted firmware, there remains the risk that new computing devices will fall into the hands of a malicious attacker during transit. Such an attacker may make modifications to the software or hardware components of such a computing device that compromise its security in a manner that is not detectable by the end recipient of the device.

One mechanism for improving the security of computing devices during transit involves provisioning the computing devices with additional hardware in the form of a radio-frequency identification ("RFID") reader or similar device. Using this mechanism, the computing devices are locked prior to departing the ODM facility such that they cannot be booted without corresponding RFID cards provided by the ODM. The ODM provides RFID cards that can be read by the RFID readers and utilized to unlock the computing devices. The ODM ships the RFID cards to the OEM or end customer separately from the computing devices themselves to minimize the probability that an attacker could access both the computing devices and the RFID cards that can be used to unlock them.

Although the mechanism described above can provide a certain level of security for computing systems during transit, this mechanism is not without its drawbacks. In particular, the mechanism described above requires that additional hardware, such as an RFID reader, be added to computing devices in order to secure them during transit. This additional hardware increases the cost, complexity, weight, and power consumption of computing devices into which it is integrated. Moreover, the process described above is complex and may suffer from various operational challenges, such as in the scenario where RFID cards are lost during shipment.

It is with respect to these and other considerations that the disclosure made herein is presented.

SUMMARY

Technologies are described herein for securing computing devices during transit. Through implementations of the technologies disclosed herein, various technical benefits can be achieved as compared to previous solutions that require additional hardware to improve security during transit such as, but not limited to, reduced cost, complexity, weight, and power consumption. The disclosed solution also does not require shipping RFID cards or other types of hardware keys and, therefore, is less complex than previous solutions and, consequently, there is no risk of operational challenges, such as in the scenario where RFID cards are lost during shipment when previous solutions are utilized. Technical benefits other than those specifically mentioned herein can also be realized through an implementation of the disclosed technologies.

According to various embodiments disclosed herein, a computing device is locked while in a trusted environment and prior to transit. For example, an ODM can utilize the disclosed technologies to lock a computing device prior to shipping the computing device to an OEM or end customer. Once it has been locked, the computing device cannot be utilized until unlocked in the disclosed manner, thereby limiting opportunities to tamper with the computing device.

As will be described in greater detail below, the recipient of computing device can unlock the computing device post-transit without the use of any additional hardware (e.g., an RFID card). Additionally, the computing device can utilize various mechanisms to determine if it has been tampered with during transit and initiate corrective action, if so. For example, the computing device powers itself off, restores firmware from a copy of the firmware known to be good, notifies a system administrator, or takes other corrective action, according to embodiments disclosed herein.

In order to provide the functionality described briefly above, a computing device is configured with a hardware root of trust ("HRoT"). A HRoT is the start of a chain of trust that leads to the creation of a secure execution environment for an operating system and other applications executing on the computing device. The HRoT is provided by specialized silicon, a field programmable gate array ("FPGA"), a microcontroller, or another type of hardware device, according to various embodiments disclosed herein.

In one embodiment, the HRoT and a remote registration server exchange public cryptographic keys ("public keys") prior to transit of the computing device while the computing device is in the trusted location. Once the public keys have been exchanged, the computing device is locked by setting a lock status of the computing device to "locked."

While the lock status of the computing device is set to locked, the HRoT will prevent the computing device from completing its boot process. In one embodiment, a memory in the HRoT is utilized to store data identifying the lock status of the computing device. The computing device is powered off and is secured for shipment once the lock status of the computing device is set to locked. The computing device can then be shipped to a recipient outside of the trusted environment, such as an OEM or and end customer.

When the computing device is powered on following transit, the HRoT determines if the lock status of the computing device is locked. If the computing device is not locked, the HRoT permits the computing device to boot in a typical fashion. If, however, the HRoT determines that the lock status of the computing device is locked, the HRoT pauses booting of the computing device. In an embodiment, the computing device is booted by executing a host firmware and a baseboard management controller ("BMC") firmware. In this embodiment, the HRoT pauses booting of the computing device by pausing execution of the host firmware and the BMC firmware.

In an embodiment, the HRoT pauses execution of the host firmware and the BMC firmware at locations defined by a user-defined policy. In this embodiment, the HRoT initiates one or more corrective actions responsive to determining that the host firmware or the BMC firmware have executed beyond the locations defined by the policy. For example, the computing device powers itself off, restores firmware from a copy of the firmware known to be good, notifies a system administrator, or takes other corrective action, according to embodiments disclosed herein.

While in the locked state, the HRoT also determines whether a request to unlock the computing device has been received. In an embodiment, for example, such a request is received by way of a firmware setup user interface. In another embodiment, such a request is received by way of a BMC that is communicatively coupled to the HRoT.

If the HRoT determines that a request to unlock the computing device has been received, the HRoT generates a symmetric cryptographic key ("symmetric key") using its private key and the public key received from the registration server, in an embodiment. The HRoT also generates a one-time password and encrypts the one-time password using the symmetric key. The HRoT then provides the encrypted one-time password to the registration server. Various mechanisms described below, including the use of a BMC or a smartphone, can be utilized to provide the encrypted one-time password from the registration server to the HRoT.

The registration server, in turn, receives the encrypted one-time password. The registration server generates the symmetric key using its private key and the public key provided by the HRoT. The registration server decrypts the one-time password. The registration server then provides the decrypted one-time password to the HRoT. Various mechanisms described below, including the use of a BMC or a smartphone, can be utilized to provide the decrypted one-time password from the HRoT to the registration server.

When the HRoT receives the decrypted one-time password from the registration server, the HRoT compares the received decrypted one-time password to the one-time password that it previously generated. If the decrypted one-time password received from the registration server is identical to the one-time password generated by the HRoT, the HRoT sets the lock status of the computing device to unlocked. The HRoT then allows the computing device to complete its boot process. For example, the HRoT can permit the host firmware and the BMC firmware to continue executing from the locations at which execution was previously paused.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Technologies are described herein for securing computing devices during transit. As discussed briefly above, implementations of the disclosed technologies can provide technical benefits as compared to previous solutions such as, but not limited to, reduced cost, complexity, weight, and power consumption as compared to solutions that require additional hardware to improve security during transit. The disclosed technologies also do not require shipping RFID cards or other types of hardware keys and, therefore, are less complex than previous solutions and, consequently, there is no risk of operational challenges, such those caused by the loss of RFID cards during shipment when previous solutions are utilized. Technical benefits other than those specifically mentioned herein can also be realized through implementations of the disclosed technologies. Additional details regarding these aspects will be provided below with regard to FIGS. 1-8.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. The configurations described herein can be practiced in distributed computing environments, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
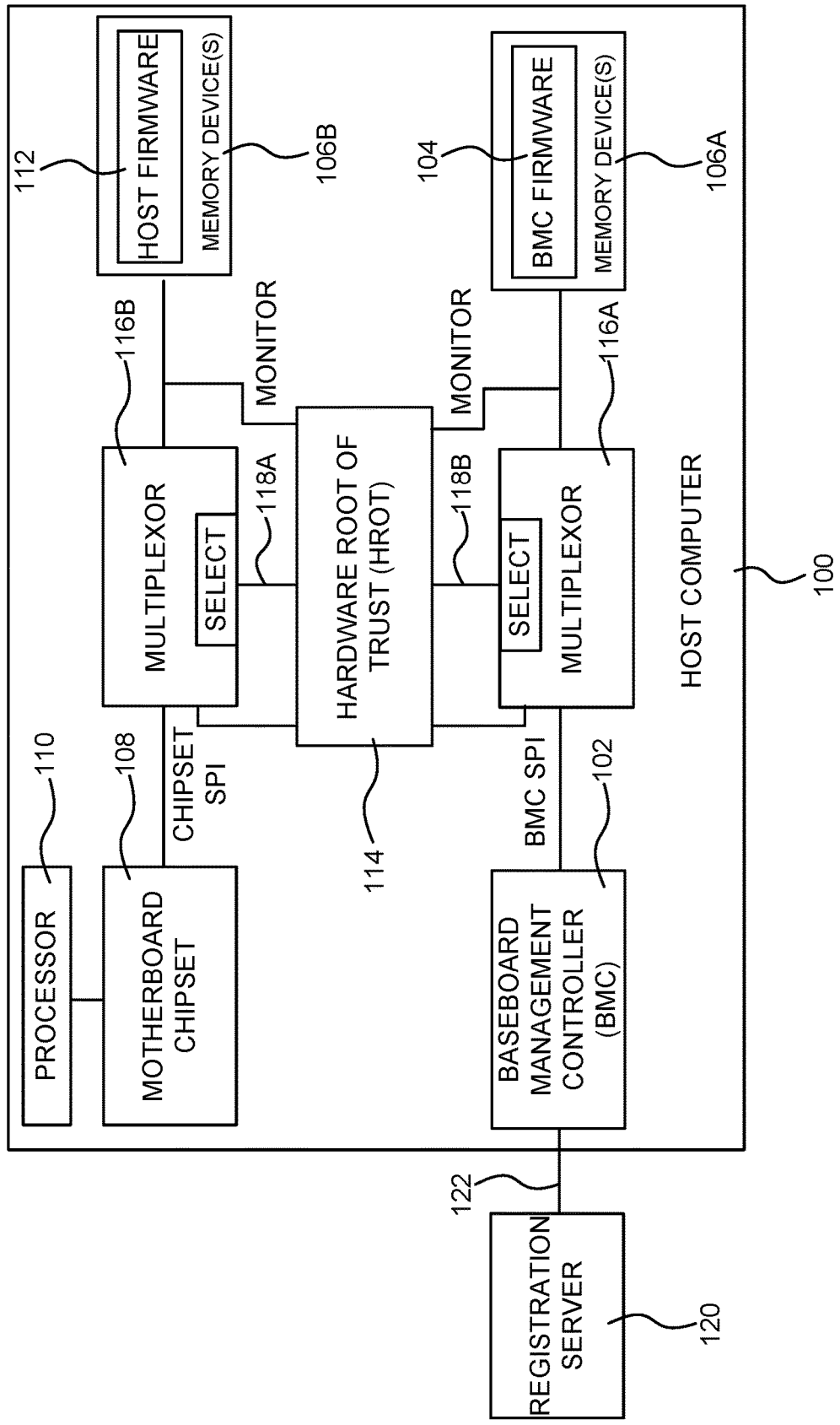
FIG. 1 is a computing system diagram illustrating aspects of the configuration and operation of a host computer configured to provide security during transit, according to one or more embodiments disclosed herein.

FIG. 1 is a computing system diagram illustrating aspects of the configuration and operation of a computing device, the host computer 100, that has been configured to provide security during transit, according to one or more embodiments disclosed herein. The host computer 100 can be implemented as a server computer, for example, with a processor 110. The processor 110 can include one or more processor cores.

According to various embodiments, the processor 110 can be a central processing unit ("CPU") from INTEL CORPORATION or ADVANCED MICRO DEVICES, INC. ("AMD"), a CPU based upon an architecture from ARM, LTD., or another type of CPU. The processor 110 can communicate with other components in the host computer 100 directly or by way of a motherboard chipset 108 and various buses.

In a host computer 100 utilizing an INTEL-based architecture, for example, the motherboard chipset can implement a Platform Controller Hub ("PCH"). In a host computer 100 utilizing an AMD-based architecture, the motherboard chipset 108 is a Fusion Controller Hub ("FCH") or a chipset compatible with the AMD ZEN architecture. Other types of motherboard chipsets 108 can be used with other types of CPU architectures. The host computer 100 can include many other components, some of which are described below.

The processor 110 executes a host firmware 112 in order to control various aspects of the operation of the host computer 100, some of which are described herein. In one embodiment, the host firmware 112 is a Unified Extensible Firmware Interface ("UEFI") Specification-compliant firmware that can be configured to provide and/or utilize aspects of the technologies disclosed herein. Other types of host firmware 112 are utilized in other embodiments. The host firmware 112 is stored in one or more memory devices 106B.

As shown in FIG. 1, the host computer 100 also includes a baseboard management controller ("BMC") 102 in some embodiments. The BMC 102 is a specialized service processor that monitors the physical state of a computer, such as the host computer 100, using sensors, and provides management information for use by a system administrator through an out-of-band ("OOB") network 122. Additional details regarding the functionality provided by the BMC 102 according to various embodiments disclosed herein are provided below.

As also shown in FIG. 1, the BMC 102 can execute a BMC firmware 104. In one embodiment, the BMC firmware 104 is based upon the LINUX operating system. In this regard, however, it is to be appreciated that another suitable firmware can be utilized in other configurations. The BMC firmware 104 is stored in one or more memory devices 106A.

The host computer 100 also includes a hardware root of trust ("HRoT") 114. As discussed briefly above, the HRoT 114 is the start of a chain of trust that leads to the creation of a secure execution environment for an operating system and other applications executing on the host computer 100. The HRoT 114 is provided by specialized silicon, a FPGA, a microcontroller, or another type of hardware device, according to various embodiments disclosed herein. Details regarding the configuration and operation of the HRoT 114 according to various embodiments disclosed herein are provided below.

As shown in FIG. 1, a multiplexor 116A is utilized in the illustrated environment to enable the HRoT 114 to communicate with the BMC 102 and the memory devices 106A. A multiplexor 116B is also utilized in the illustrated environment to enable the HRoT 114 to communicate with the motherboard chipset 108 and the memory devices 106B. Using the select lines 118A and 118B, respectively, the HRoT 114 can select the device(s) with which it is communicating at any given time. Various buses can be utilized for communication in this manner including, but not limited to, a serial peripheral interface ("SPI") bus. Other types of buses can be utilized in other embodiments.

According to various embodiments, the HRoT 114 can verify the originality of the host firmware 112 and the BMC firmware 104 using public key cryptography. Verification can occur prior to execution of the host firmware 112 and the BMC firmware 104. For example, the host firmware 112 and the BMC firmware 104 is signed with a private key that is kept secret (e.g., by an ODM), and the originality of the host firmware 112 and the BMC firmware 104 are verified each time the host computer 100 is powered on making use of a public key that is fused in a one-time programmable memory (e.g., a memory in the HRoT 114).

If the HRoT 114 can cryptographically verify the host firmware 112, the HRoT 114 causes the processor 110 to exit from reset and begin executing the host firmware 112. Similarly, if the HRoT 114 can cryptographically verify the BMC firmware 104, the HRoT 114 causes the BMC 102 to begin executing the BMC firmware 104.

If the HRoT 114 cannot cryptographically verify the BMC firmware 104, the HRoT 114 will recover the BMC firmware 104. For example, the HRoT 114 might retrieve a valid copy of the BMC firmware 104 and store the valid BMC firmware in the memory devices 106A. In a similar fashion, the HRoT 114 can obtain a valid host firmware 112 for the host computer 100 and store the valid firmware in the memory devices 106B if it is unable to cryptographically verify the host firmware 112.

As shown in FIG. 1, the host computer 100 is also configured for communication with a remote registration server 120, according to one embodiment disclosed herein. The registration server 120 is a network accessible server computer that provides the functionality described below for securing computing devices, such as the host computer 100, during transit. Additional details regarding the operation of the registration server 120 are provided below.

Figure 2:
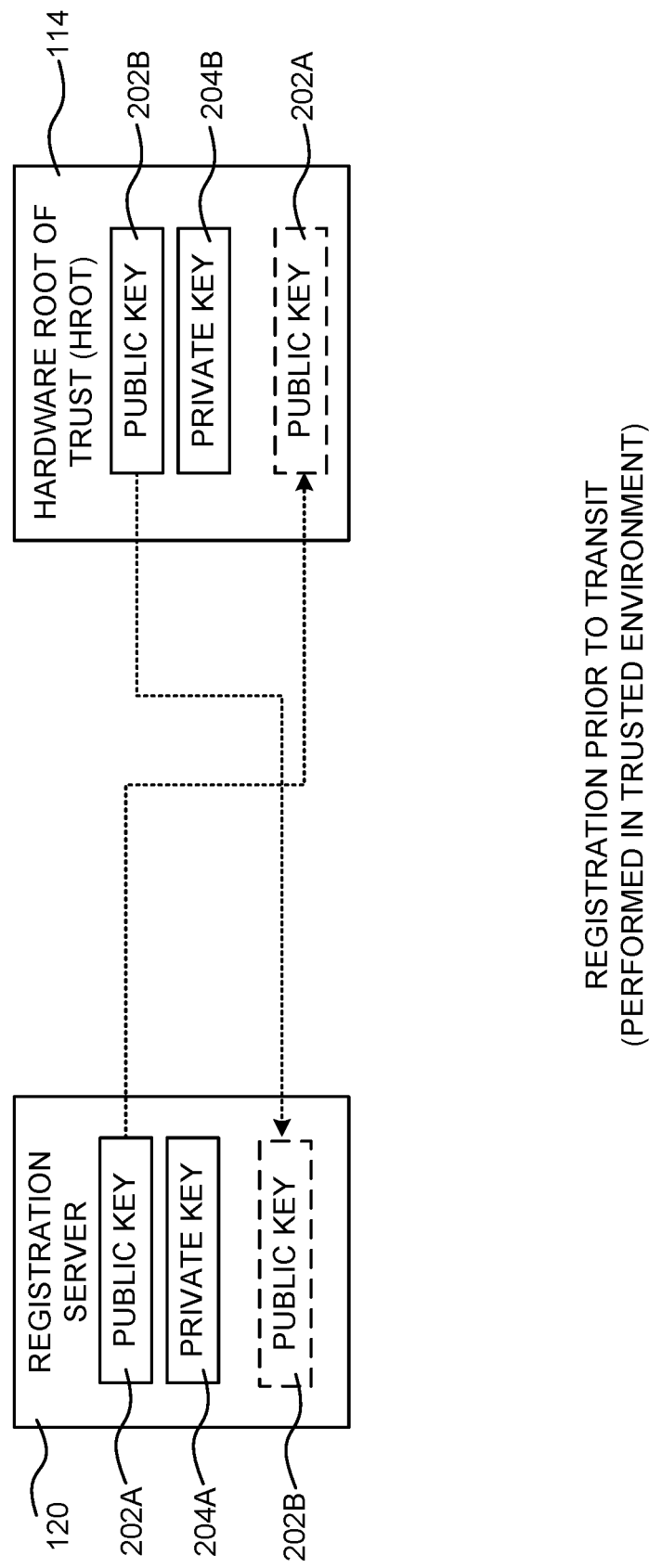
FIG. 2 is a software architecture diagram showing aspects of one mechanism for registering the host computer shown in FIG. 1 with a registration server and for performing an exchange of encryption keys with the registration server, in one embodiment disclosed herein.

FIG. 2 is a software architecture diagram showing aspects of one mechanism for registering the host computer 100 shown in FIG. 1 with a registration server 120 and for performing an exchange of encryption keys with the registration server 120, in one embodiment disclosed herein. In the illustrated embodiment, the HRoT 114 and the registration server 120 exchange public keys 204A and 202B prior to transit of the host computer 100 while the host computer 100 in a trusted location.

For example, the key exchange illustrated in FIG. 2 can be performed by the host computer 100 while the device is still located at an ODM's manufacturing facility and prior to being shipped to an OEM or end customer. The corresponding private keys 204A and 204B, respectively, are kept secret and are not exchanged between the HRoT 114 and the registration server 120. Details regarding the utilization of the public keys 202A and 202B and the private keys 204A and 204B according to various embodiments disclosed herein are provided below.

Figure 3:
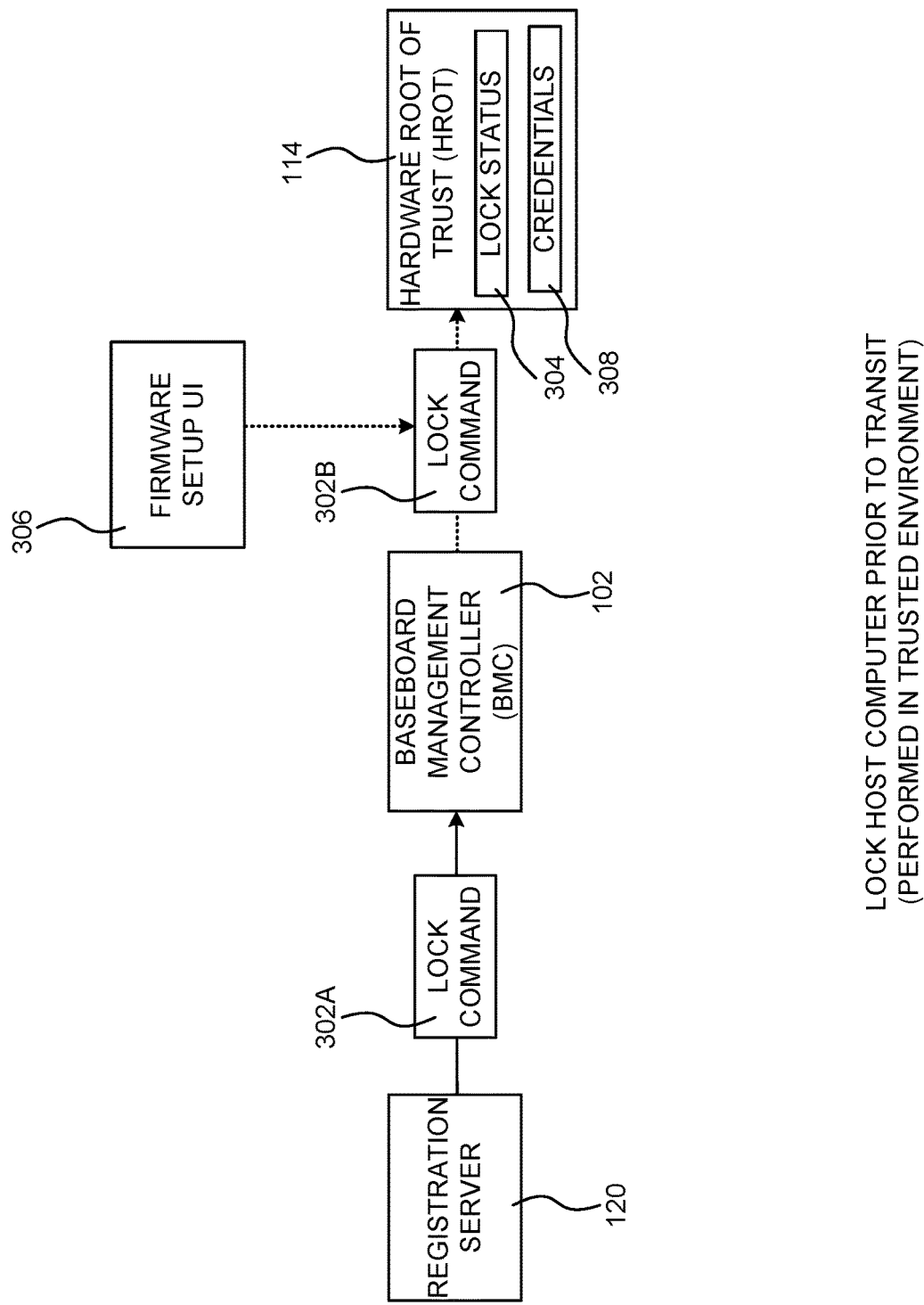
FIG. 3 is a software architecture diagram showing aspects of one mechanism for locking the host computer shown in FIG. 1 prior to transit, in one embodiment disclosed herein.

FIG. 3 is a software architecture diagram showing aspects of one mechanism for locking the host computer 100 shown in FIG. 1 prior to transit, in one embodiment disclosed herein. In particular, once the public keys 202A and 202B have been exchanged in the manner described above with respect to FIG. 2, the host computer 100 is locked by setting a lock status of the computing device to "locked." In the illustrated embodiment, a memory in the HRoT 114 is utilized to store data identifying the lock status 304 of the host computer 100.

As will be described in greater detail below, while the lock status 304 of the host computer 100 is set to locked, the HRoT 114 will prevent the host computer 100 from completing its boot process. The HRoT 114 will allow the host computer 100 to boot in a typical fashion if the lock status 304 of the host computer 100 is set to unlocked.

In one embodiment, the host firmware 112 provides a firmware setup user interface ("UI") 306. The firmware setup UI 306 provides a UI through which a user of the host computer 100 can issue a lock command 302B. As shown in FIG. 3, the HRoT 114 can also maintain credential 308 for users authorized to modify the lock status 304. The HRoT 114 can authenticate users against the stored credentials 308 prior to implementing a lock command 302A or 302B or a command for unlocking the host computer 100.

In another embodiment, the registration server 120 provides functionality for enabling a user to issue a lock command 302A to the BMC 102. The BMC 102, in turn, instructs the HRoT 114 to change the lock status 304 to locked. Other mechanisms can be provided capable of issuing a lock command to the HRoT 114 in other embodiments.

Once the lock status 304 is set to locked in the manner described above, the host computer 100 is powered off. The host computer 100 can then be shipped to a recipient outside of the trusted environment, such as an OEM or and end customer.

Figure 4:
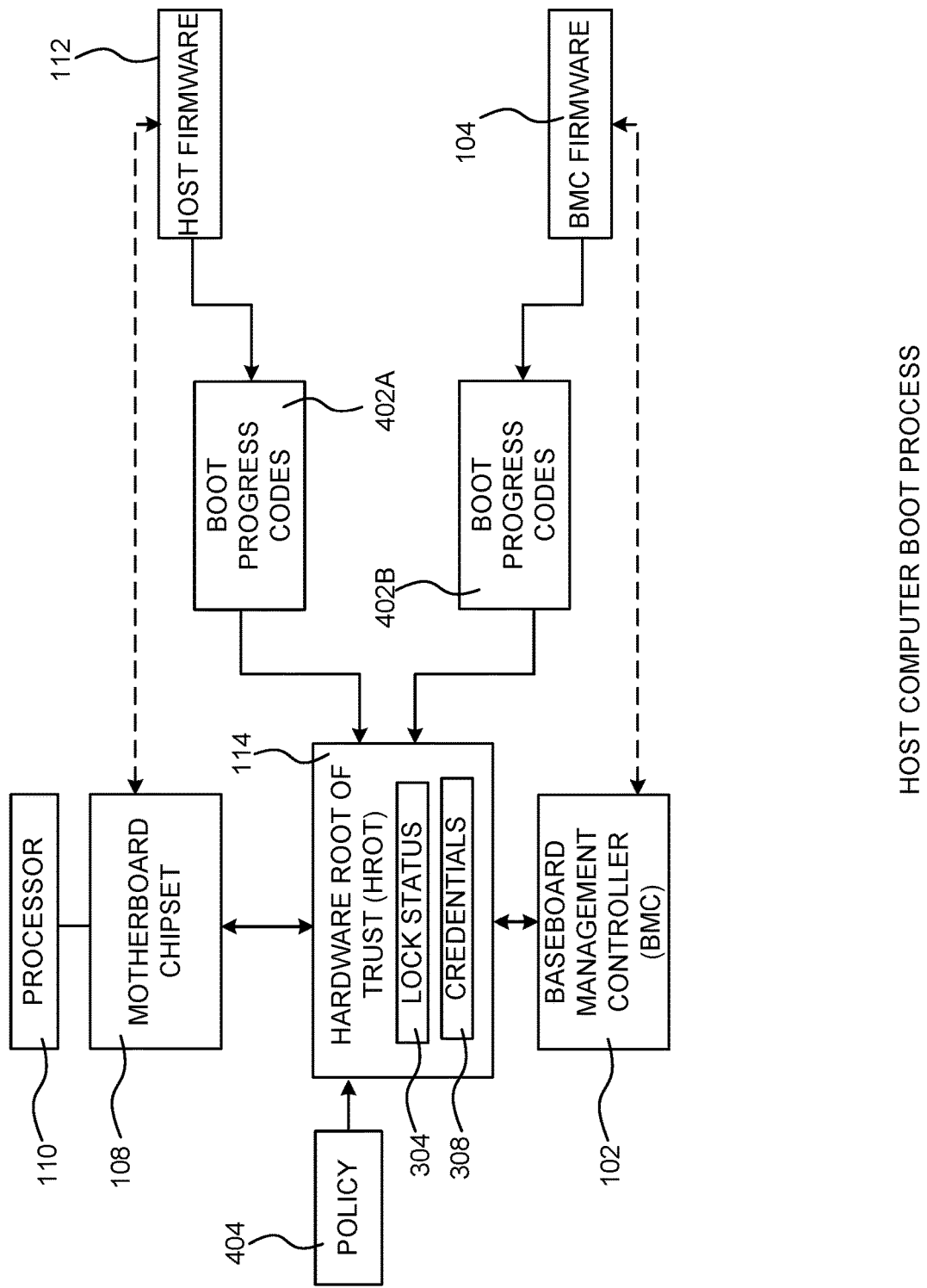
FIG. 4 is a software architecture diagram showing aspects of a process for booting the host computing shown in FIG. 1 in a secure manner, in one embodiment disclosed herein.

FIG. 4 is a software architecture diagram showing aspects of a process for booting the host computing 100 shown in FIG. 1 in a secure manner post-transit, in one embodiment disclosed herein. When the host computer 100 is powered on following transit, the HRoT 114 determines if the lock status of the host computer 100 is locked (e.g., by examining the state of the lock status 304). If the host computer 100 is not locked, the HRoT 114 permits the host computer 100 to boot in a typical fashion. For example, the HRoT 114 will allow the host firmware 112 and the BMC firmware 104 to fully execute without interruption.

If, however, the HRoT 114 determines that the lock status 304 of the host computer 100 indicates that the host computer 100 is locked, the HRoT 114 pauses booting of the host computer 100. As discussed above, booting the host computer 100 includes executing the host firmware 112 and the BMC firmware 104. The HRoT 114 pauses booting of the host computer 100 by pausing execution of the host firmware 112 and the BMC firmware 104.

In an embodiment, the HRoT 114 pauses execution of the host firmware 112 and the BMC firmware 104 at locations defined by a user-defined policy 404, which might be specified through the firmware setup UI 306 or through the registration server 102 or another management system. For instance, the policy 404 might specify that the host firmware 112 is not permitted to begin executing at all, but that the BMC firmware 104 is permitted to execute until the BMC 102 can establish connectivity with the registration server 120.

In an embodiment, the HRoT 114 initiates one or more corrective actions responsive to determining that the host firmware 112 or the BMC firmware 104 have executed beyond the locations defined by the policy 404. In order to enable this functionality, the HRoT 114 receives boot progress codes 402A from the host firmware 112 and boot progress codes 402B from the BMC firmware 104. The boot progress codes 402A and 402B indicate the stages of execution that the host firmware 112 and the BMC firmware 104, respectively, have completed. If the host firmware 112 or the BMC firmware 104 execute beyond the locations defined by the policy 404 (as indicated by the boot progress codes 402A/402B), the host computer 100 can power itself off, restore the host firmware 112 or the BMC firmware 104 from verified versions, notify a system administrator, or take another type of corrective action, according to embodiments disclosed herein.

Figure 5A:
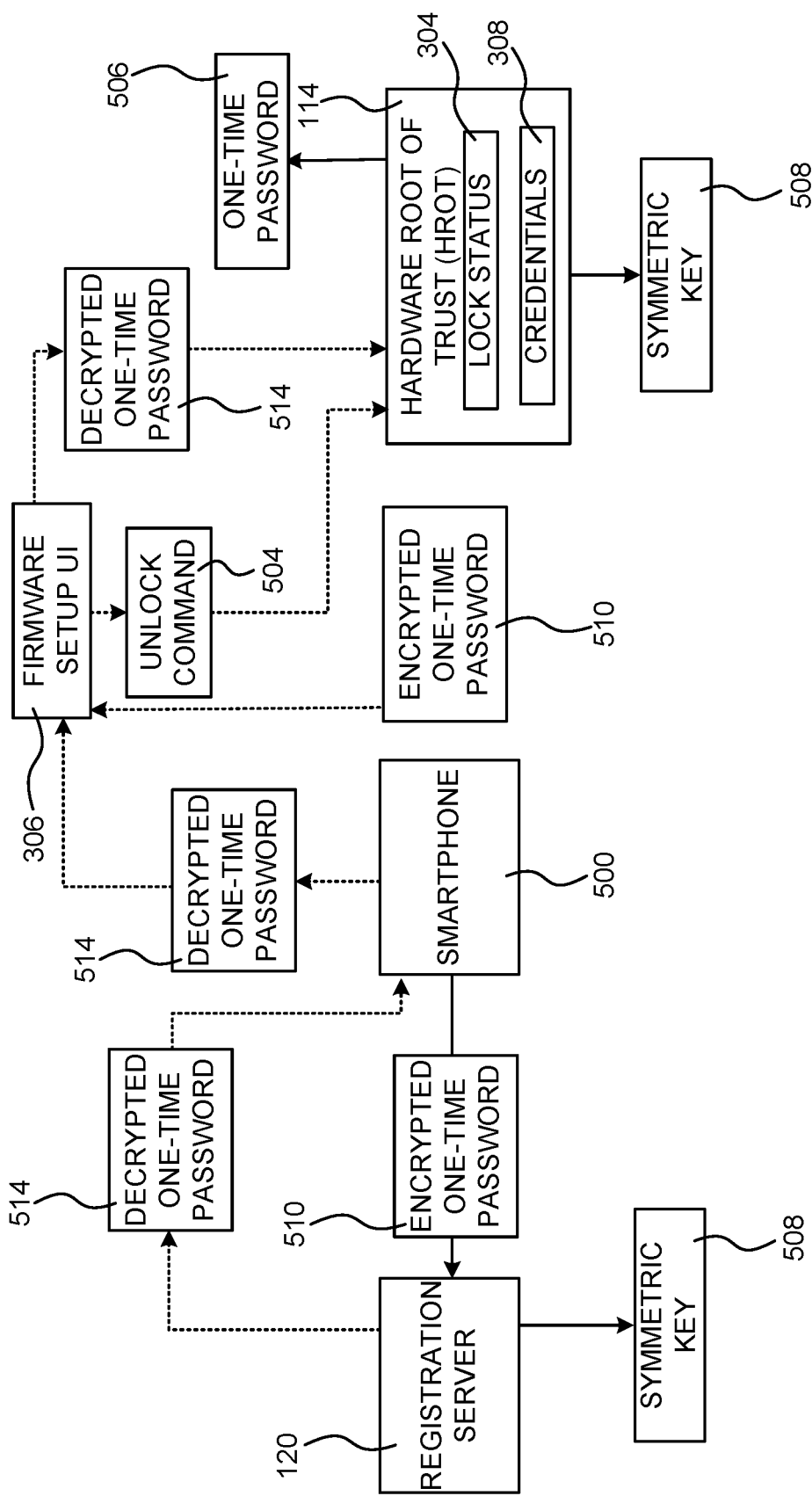
FIG. 5A is a software architecture diagram showing aspects of one mechanism for unlocking the host computer shown in FIG. 1 following transit using a smartphone, in one embodiment disclosed herein.

FIG. 5A is a software architecture diagram showing aspects of one mechanism for unlocking the host computer 100 shown in FIG. 1 post-transit using a smartphone 500 or another type of computing device (e.g., a laptop, tablet, or another type of portable computing device), in one embodiment disclosed herein. As discussed briefly above, while in the locked state, the HRoT 114 also determines whether a request to unlock the host computer 100 has been received. In an embodiment, for example, an unlock command 504 is received by way of the firmware setup UI 306, which is provided by the host firmware 112. In another embodiment, which will be described below with regard to FIG. 5B, an unlock command 504 is received from the registration server 120 by way of the BMC 102.

If the HRoT 114 determines that an unlock command 504 has been received, the HRoT 114 generates a symmetric cryptographic key 508 ("symmetric key") using its private key 204B and the public key 202A received from the registration server 120, in an embodiment. The Elliptic Curve Integrated Encryption Scheme ("ECIES") is utilized to generate the symmetric key 508 in one embodiment disclosed herein. Other mechanisms can be utilized in other embodiments.

The HRoT 114 also generates a one-time password 506 and encrypts the one-time password 506 using the symmetric key 508. The HRoT 114 then provides the encrypted one-time password 510 to the registration server 120. In the embodiment shown in FIG. 5A, a smartphone 500 (or another type of computing device) is utilized to provide the encrypted one-time password 510 (e.g., a random number that is used only one) from the HRoT 114 to the registration server. In this embodiment, a quick response code ("QR code") or similar type of encoding is generated that includes the encrypted one-time password 510 and a uniform resource identifier ("URI") for a network address exposed by the registration server 120 for providing the encrypted one-time password 510. The firmware setup UI 306 displays the QR code, which can then be scanned using the smartphone 500.

When a user scans the QR code, the smartphone 500 decodes the URI for the registration server 120 and provides the encrypted one-time password 510 to the registration server 120. A user might also be asked to provide credentials for authenticating with the registration server. The registration server, in turn, receives the encrypted one-time password 510 from the smartphone 500. The registration server 120 then generates the symmetric key 508 using its private key 204A and the public key 202B provided by the HRoT 114 in the manner described above with respect to FIG. 2. As discussed above, ECIES is utilized to generate the symmetric key 508 in one embodiment disclosed herein. Other mechanisms can be utilized in other embodiments.

The registration server 120 then decrypts the one-time password 506 using the symmetric key 508. The registration server 120 then provides the decrypted one-time password 514 to the HRoT 114. In the embodiment shown in FIG. 5A, the registration server 120 transmits the decrypted one-time password 514 to the smartphone 500, which displays the decrypted one-time password 514 to a user. The user, in turn, types the decrypted one-time password 514 into the firmware setup UI 306. The firmware setup UI 306 then provides the decrypted one-time password 514 to the HRoT 114.

When the HRoT 114 receives the decrypted one-time password from the firmware setup UI 306, the HRoT 114 compares the received decrypted one-time password 514 to the one-time password 506 that it previously generated. If the decrypted one-time password 514 received from the registration server 120 is identical to the one-time password 506 generated by the HRoT 114, the HRoT 114 sets the lock status 304 of the host computer 100 to unlocked. The HRoT 114 then allows the host computer 100 to complete its boot process. For example, the HRoT 114 can permit the host firmware 112 and the BMC firmware 104 to continue executing from the locations at which execution was previously paused.

Figure 5B:
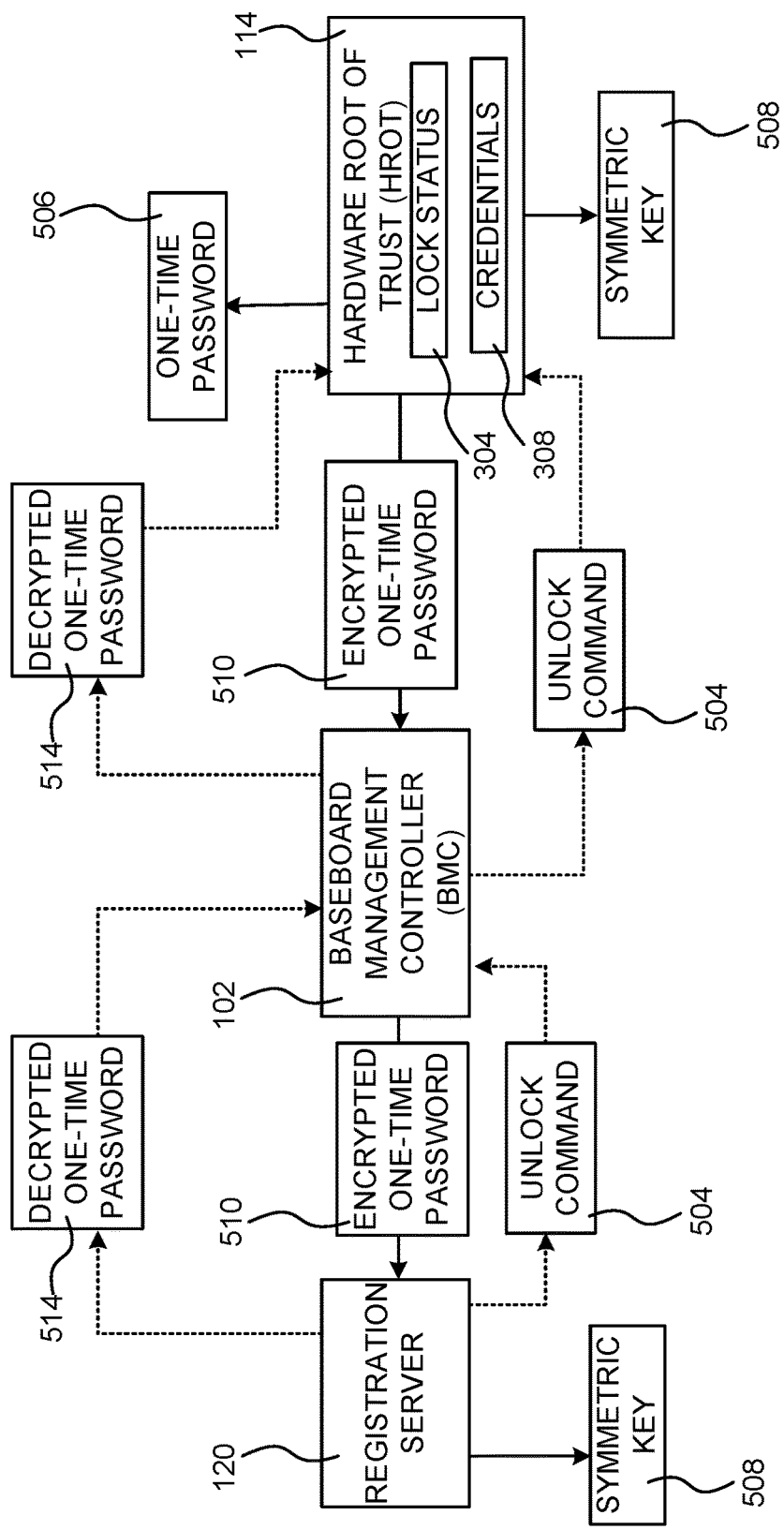
FIG. 5B is a software architecture diagram showing aspects of one mechanism for unlocking the host computer shown in FIG. 1 following transit using a baseboard management controller ("BMC"), in one embodiment disclosed herein.

FIG. 5B is a software architecture diagram showing aspects of one mechanism for unlocking the host computer 100 shown in FIG. 1 following transit using the BMC 102, in one embodiment disclosed herein. In the embodiment shown in FIG. 5B, a user of the registration server 120 can provide an unlock command 504 by way of a UI or another suitable interface. The registration server 120, in turn, provides the unlock command to the BMC 102. The BMC 102, in turn, provides the unlock command 504 to the HRoT 114.

When the HRoT 114 the unlock command 504 from the BMC 102, the HRoT 114 generates the symmetric key 508 using its private key 204B and the public key 202A received from the registration server 120, in the manner described above. The HRoT 114 also generates the one-time password 506 and encrypts the one-time password 506 using the symmetric key 508. The HRoT 114 then provides the encrypted one-time password 510 to the BMC 102 which, in turn, provides the encrypted one-time password 510 to the registration server 120.

The registration server 120 receives the encrypted one-time password 510 from the BMC 102. The registration server 120 then generates the symmetric key 508 using its private key 204A and the public key 202B in the manner described above. The registration server 120 decrypts the one-time password 506 using the symmetric key 508. The registration server 120 then provides the decrypted one-time password 514 to the HRoT 114. In the embodiment shown in FIG. 5B, the registration server 120 transmits the decrypted one-time password 514 to the BMC 102 which, in turn, provides the decrypted one-time password 514 to the HRoT 114.

When the HRoT 114 receives the decrypted one-time password from the BMC 102, the HRoT 114 compares the received decrypted one-time password 514 to the one-time password 506 that it previously generated. If the decrypted one-time password 514 received from the BMC 102 is identical to the one-time password 506 generated by the HRoT 114, the HRoT 114 sets the lock status 304 of the host computer 100 to unlocked. The HRoT 114 then allows the host computer 100 to complete its boot process. For example, the HRoT 114 can permit the host firmware 112 and the BMC firmware 104 to continue executing from the locations at which execution was previously paused in the manner described above.

Figure 6:
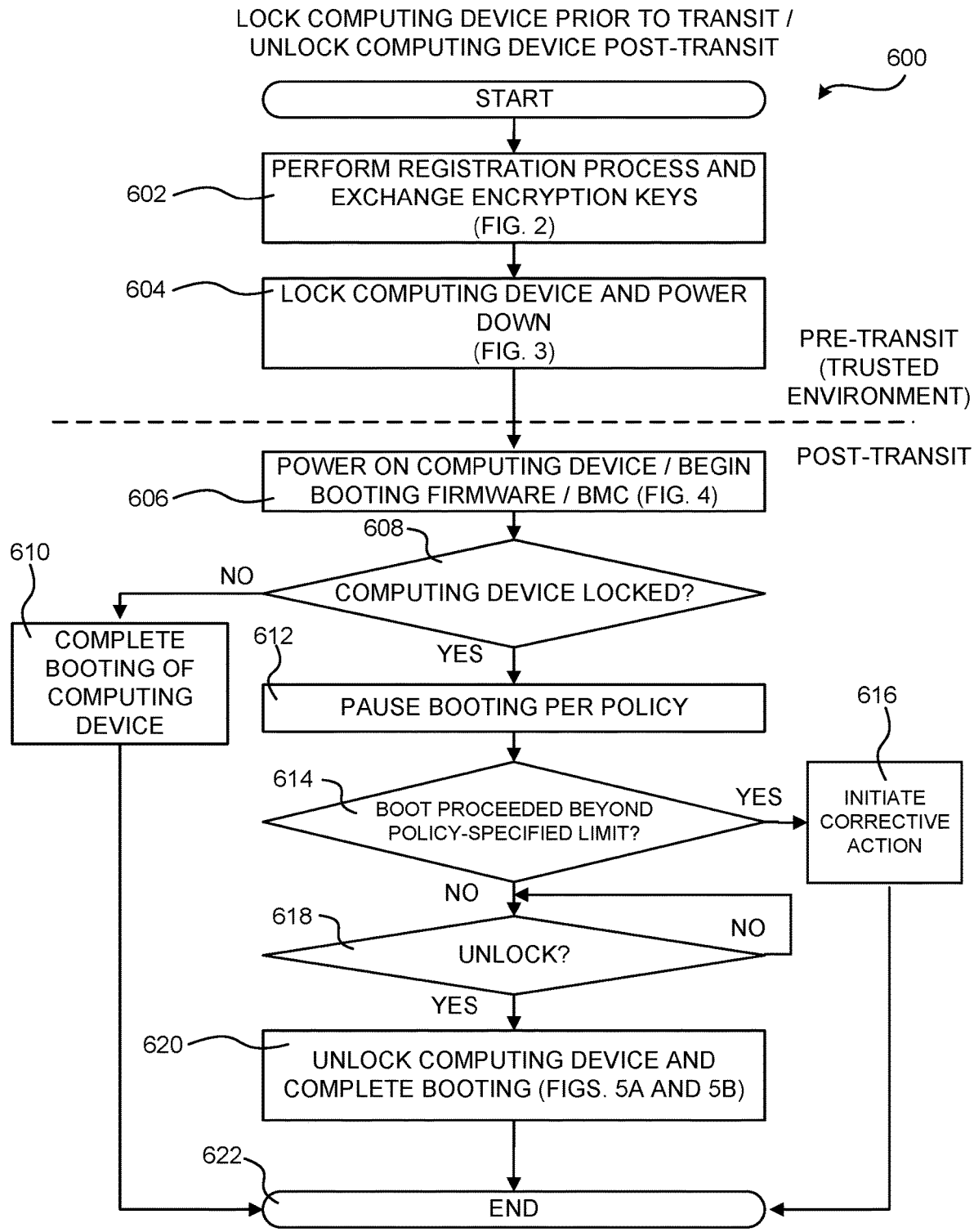
FIG. 6 is a flow diagram illustrating aspects of a routine for locking the host computer shown in FIG. 1 prior to transit and unlocking the host computer post-transit, according to one or more embodiments presented herein.

FIG. 6 is a flow diagram illustrating aspects of a routine 600 for locking the host computer 100 shown in FIG. 1 prior to transit and unlocking the host computer 100 post-transit, according to one or more embodiments presented herein. It is to be appreciated that the logical operations described herein with respect to FIG. 6, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. These operations can also be performed by components other than those specifically identified.

The routine 600 begins at operation 602, where the HRoT 114 and the registration server 120 exchange public keys in the manner described above with respect to FIG. 2. The routine 600 then proceeds from operation 602 to operation 604, where the host computer 100 is locked and powered down in the manner described above with respect to FIG. 3. The operations 602 and 604 are preferably performed prior to the host computer 100 leaving a trusted environment (e.g., prior to shipping the host computer 100 outside of an ODM facility known to be trusted). Operations 606-622, described below, are performed post-transit.

From operation 606, the routine 600 proceeds to operation 606, where the host computer 100 is powered on and the host firmware 112 and the BMC firmware 104 begin execution. The routine 600 then proceeds from operation 606 to operation 608, where the HRoT 114 determines if the lock status 304 indicates that the host computer 100 is locked. If the host computer 100 is not locked, the routine 600 proceeds from operation 608 to operation 610, where the HRoT 114 allows the host firmware 112 and the BMC firmware 104 to execute in order to boot the host computer 100. The routine 600 proceeds from operation 610 to operation 622, where it ends.

If, at operation, the HRoT 114 determines that the lock status 304 indicates that the host computer 100 is locked, the routine 600 proceeds from operation 608 to operation 612. At operation 612, the HRoT 114 pauses booting of the host computer 100. As discussed above, in an embodiment the HRoT 114 pauses execution of the host firmware 112 and the BMC firmware 104 at locations defined by a user-defined policy 404, which might be specified through the firmware setup UI 306 or through the registration server 102 or another management system. For instance, the policy 404 might specify that the host firmware 112 is not permitted to begin executing at all, but that the BMC firmware 104 is permitted to execute until the BMC 102 can establish connectivity with the registration server 120.

Once booting has been paused, the routine 600 proceeds from operation 612 to operation 614, where the HRoT 114 determines whether the host firmware 112 or the BMC firmware 104 have executed beyond the locations defined by the policy 404. As discussed above, the HRoT 114 receives boot progress codes 402A from the host firmware 112 and boot progress codes 402B from the BMC firmware 104. The boot progress codes 402A and 402B indicate the stages of execution that the host firmware 112 and the BMC firmware 104, respectively, have completed.

If the host firmware 112 or the BMC firmware 104 execute beyond the locations defined by the policy 404 (as indicated by the boot progress codes 402A/402B), the routine 600 proceeds from operation 614 to operation 616, where the host computer 100 takes one or more corrective actions. For example, and without limitation, the host computer 100 can power itself off, restore the host firmware 112 or the BMC firmware 104 from verified versions, notify a system administrator, or take another type of corrective action, according to embodiments disclosed herein. The routine 600 then proceeds from operation 616 to operation 622, where it ends.

If the host firmware 112 and the BMC firmware 104 have not executed beyond the locations defined by the policy 404, the routine 600 proceeds from operation 614 to operation 618. At operation 618, the HRoT 114 determines whether an unlock command 504 has been received. If an unlock command 504 has been received, the routine 600 proceeds from operation 618 to operation 620, where the HRoT 114 can determine whether to unlock the host computer 100 in the manner described above with respect to FIGS. 5A and 5B. If the HRoT 114 unlocks the host computer 100, the host computer 100 can complete booting in a typical fashion by executing the host firmware 112 and the BMC firmware 104 to completion. The routine 600 then proceeds from operation 620 to operation 622, where it ends.

Figure 7:
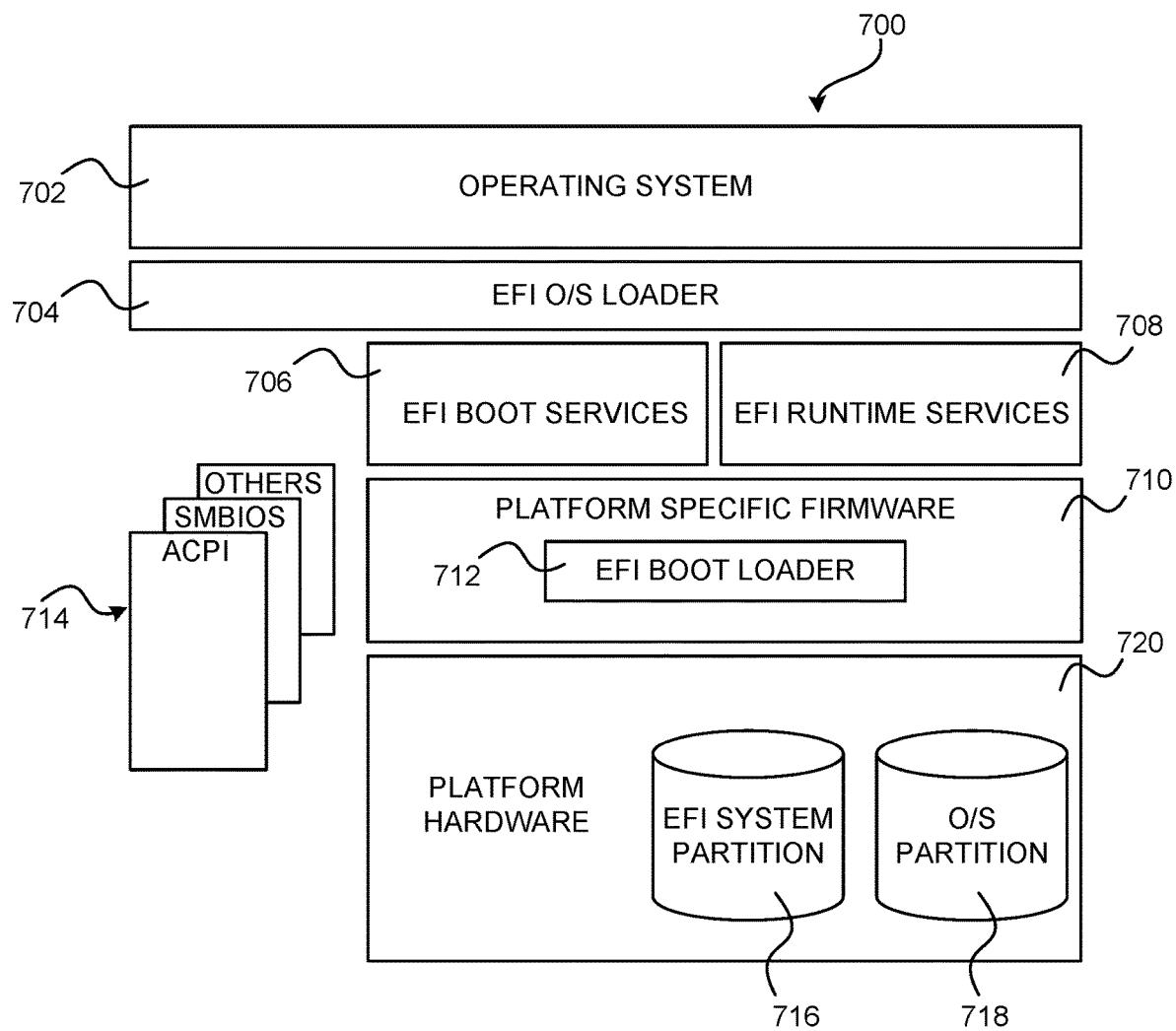
FIG. 7 is a software architecture diagram illustrating a software architecture for a unified extensible firmware interface ("UEFI")-compliant firmware utilized by the host computer shown in FIG. 1, in one embodiment disclosed herein.

Turning now to FIG. 7, a software architecture diagram will be described that illustrates an architecture for a UEFI Specification-compliant firmware 700 that can be configured to provide and/or utilize aspects of the technologies disclosed herein. In particular, the firmware architecture shown in FIG. 7 can be utilized to implement the host firmware 112 described above. The host firmware 112 can also be implemented in other ways in other configurations.

The UEFI Specification describes an interface between an operating system 702 and a UEFI Specification-compliant firmware 700. The UEFI Specification also defines an interface that a firmware 700 can implement, and an interface that an operating system 702 (which might be referred to herein as an "OS") can use while booting. How a firmware implements the interface can be left up to the manufacturer of the firmware. The UEFI Specification also defines a way for an operating system 702 and a firmware 700 to exchange information necessary to support the operating system boot process. The term "UEFI Specification" used herein refers to both the EFI Specification developed by INTEL CORPORATION and the UEFI Specification managed by the UEFI FORUM.

As shown in FIG. 7, the architecture can include platform hardware 720, such as that described below with regard to FIG. 8, and an operating system 702. A boot loader 712 for the operating system 702 can be retrieved from the UEFI system partition 716 using a UEFI operating system loader 704. The UEFI system partition 716 can be an architecturally shareable system partition. As such, the UEFI system partition 716 can define a partition and file system designed to support safe sharing of mass storage between multiple vendors. An OS partition 718 can also be utilized.

Once started, the UEFI OS loader 704 can continue to boot the complete operating system 702. In doing so, the UEFI OS loader 704 can use UEFI boot services 706, an interface to other supported specifications to survey, comprehend, and initialize the various platform components and the operating system software that manages them. Thus, interfaces 714 from other specifications can also be present on the system. For example, the Advanced Configuration and Power Interface ("ACPI") and the System Management BIOS ("SMBIOS") specifications can be supported.

UEFI boot services 706 can provide interfaces for devices and system functionality used during boot time. UEFI runtime services 708 can also be available to the UEFI OS loader 704 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 702 and system firmware 700, the Framework is a group of specifications that together describe a firmware implementation that has been designed to perform the full range of operations that are required to initialize a platform from power on through transfer of control to the operating system 702. The specifications that make up the Framework, which are also available from INTEL CORPORATION, are also expressly incorporated herein by reference.

Figure 8:
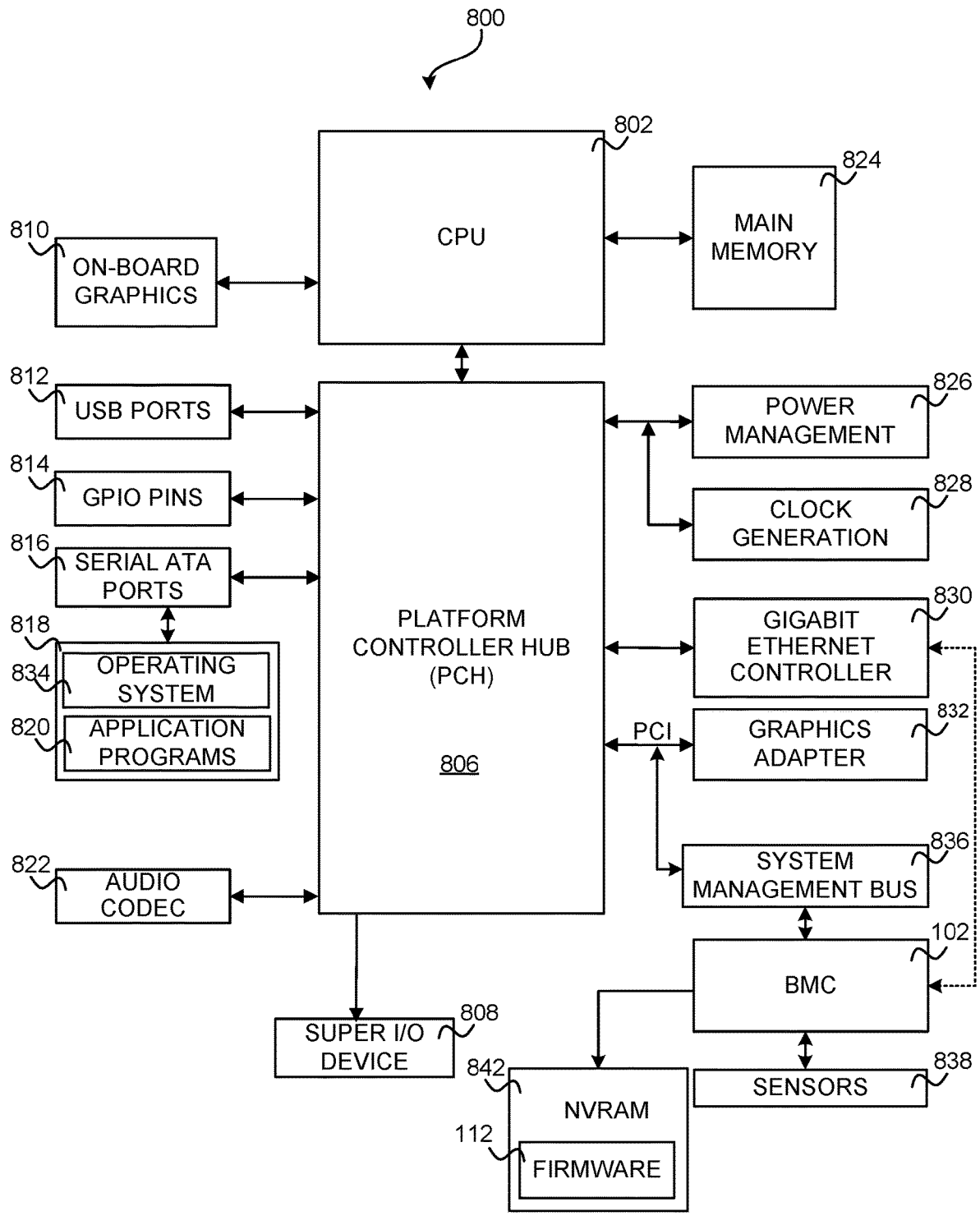
FIG. 8 is a computer architecture diagram that shows an illustrative architecture for a computing device that can implement the technologies disclosed herein, such as the host computer shown in FIG. 1, according to one or more embodiments presented herein.

Referring now to FIG. 8, a computer architecture diagram that shows an illustrative architecture for a computer that can provide an operating environment for the technologies presented herein will be described. For example, and without limitation, the computer architecture shown in FIG. 8 can be utilized to implement the host computer 100 and/or any of the other computing systems disclosed herein.

FIG. 8 and the following discussion are intended to provide a brief, general description of a suitable computing environment in which the technologies described herein can be implemented. While the technical details are presented herein in the general context of program modules that execute in conjunction with the execution of firmware, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 8 shows an illustrative computer architecture for a computer 800 that can be utilized as a host computer 100 in the implementations described herein. The illustrative computer architecture shown in FIG. 8 includes a baseboard, or "motherboard", which is a printed circuit board to which a multitude of components or devices can be connected by way of a system bus or other electrical communication path.

In one illustrative configuration, a central processing unit ("CPU") 802 operates in conjunction with a Platform Controller Hub ("PCH") 806. The CPU 802 is a central processor that performs arithmetic and logical operations necessary for the operation of the computer 800. The computer 800 can include a multitude of CPUs 802. Each CPU 802 might include multiple processing cores.

The CPU 802 provides an interface to a random access memory ("RAM") used as the main memory 824 in the computer 800 and, possibly, to an on-board graphics adapter 810. The PCH 806 provides an interface between the CPU 802 and the remainder of the computer 800.

The PCH 806 can also be responsible for controlling many of the input/output functions of the computer 800. In particular, the PCH 806 can provide one or more universal serial bus ("USB") ports 812, an audio codec 822, a Gigabit Ethernet Controller 832, and one or more general purpose input/output ("GPIO") pins 814. The USB ports 812 can include USB 2.0 ports, USB 3.0 or 3.1 ports, and/or USB-C ports among other USB ports.

The PCH 806 can also include functionality for providing networking functionality through a Gigabit Ethernet Controller 830. The Gigabit Ethernet Controller 830 is capable of connecting the computer 800 to another computer via a network. Connections which can be made by the Gigabit Ethernet Controller 830 can include LAN or WAN connections. LAN and WAN networking environments are commonplace in offices, enterprise-wide computer networks, intranets, and the Internet.

The PCH 806 can also provide a bus for interfacing peripheral card devices such as a graphics adapter 832. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 806 can also provide a system management bus 834 for use in managing the various components of the computer 800. Additional details regarding the operation of the system management bus 836 and its connected components are provided below. Power management circuitry 826 and clock generation circuitry 828 can also be utilized during the operation of the PCH 806.

The PCH 806 is also configured to provide one or more interfaces for connecting mass storage devices to the computer 800. For instance, according to one configuration, the PCH 806 includes a serial advanced technology attachment ("SATA") adapter for providing one or more serial ATA ports 816. The serial ATA ports 816 can be connected to one or more mass storage devices, such as a SATA disk drive 818, for storing an OS 834 and application programs 820. As known to those skilled in the art, an OS 834 comprises a set of programs that control operations of a computer and allocation of resources. An application program is software that runs on top of the operating system 834, or other runtime environment, and uses computer resources to perform application specific tasks desired by a user.

In one embodiment, the OS 834 is the LINUX operating system. In another embodiment, the OS 834 is a member of the WINDOWS operating system family from MICROSOFT CORPORATION. In another embodiment, the OS 834 is the UNIX operating system or one of its variants. It should be appreciated that other operating systems can also be utilized.

The mass storage devices connected to the PCH 806, and their associated computer-readable storage media, provide non-volatile storage for the computer 800. Although the description of computer-readable storage media contained herein refers to a mass storage device, such as a hard disk, CD-ROM, or DVD-ROM drive, it should be appreciated by those skilled in the art that computer-readable storage media can be any available media that can be accessed by the computer 800.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information, and which can be accessed by the computer 800.

A low pin count ("LPC") interface can also be provided by the PCH 806 for connecting a Super I/O device 808. The Super I/O device 808 is responsible for providing a number of input/output ports, including a keyboard port, a mouse port, a serial interface, a parallel port, and other types of input/output ports (not shown in FIG. 8).

It should be appreciated that the program modules disclosed herein can include software instructions that, when loaded into the CPU 802 and executed, transform a general-purpose computer 800 into a special-purpose computer 800 customized to facilitate all, or part of, the operations disclosed herein. As detailed throughout this description, the program modules can provide various tools or techniques by which the computer 800 can participate within the overall systems or operating environments using the components, logic flows, and/or data structures discussed herein.

The CPU 802 can be constructed from any number of transistors or other circuit elements, which can individually or collectively assume any number of states. More specifically, the CPU 802 can operate as a state machine or finite-state machine. Such a machine can be transformed to a second machine, or a specific machine, by loading executable instructions contained within the program modules. These computer-executable instructions can transform the CPU 802 by specifying how the CPU 802 transitions between states, thereby transforming the transistors or other circuit elements constituting the CPU 802 from a first machine to a second machine, wherein the second machine can be specifically configured to perform the operations disclosed herein. The states of either machine can also be transformed by receiving input from one or more user input devices, network interfaces (such as the Gigabit Ethernet Controller 830), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to the technology used to implement the storage media, whether the storage media are characterized as primary or secondary storage, and the like. For example, if the storage media are implemented as semiconductor-based memory, the program modules can transform the physical state of the semiconductor main memory and/or NVRAM. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described above, the PCH 806 can include a system management bus 836. As discussed above, when utilized to implement the host computer 100, the system management bus 114 can include a BMC 102. As discussed above, the BMC 102 is a microcontroller includes functionality for monitoring aspects of the operation of the computer 800. In the more specific configuration shown in FIG. 1 and described above, the BMC 102 monitors health-related aspects associated with the computer 800, such as, but not limited to, the temperature of one or more components of the computer 800, speed of rotational components (e.g., spindle motor, CPU fan, etc.) within the computer 800, the voltage across or applied to one or more components within the computer 800, and the available and/or used capacity of memory devices within the computer 800. To accomplish these monitoring functions, the BMC 102 is communicatively connected to one or more components by way of the system management bus 836 in some configurations.

In one configuration, these components include sensor devices 838 for measuring various operating and performance-related parameters within the computer 800. The sensor devices 838 can be either hardware or software based components configured or programmed to measure or detect one or more of the various operating and performance-related parameters.

The BMC 102 functions as the master on the system management bus 836 in most circumstances, but can also function as either a master or a slave in other circumstances. Each of the various components communicatively connected to the BMC 102 by way of the system management bus 836 is addressed using a slave address. The system management bus 836 is used by the BMC 102 to request and/or receive various operating and performance-related parameters from one or more components that are also communicatively connected to the system management bus 836.

It should be appreciated that the functionality provided by the computer 800 can be provided by other types of computing devices, including hand-held computers, smartphones, gaming systems, set top boxes, tablet computers, embedded computer systems, personal digital assistants, and other types of computing devices known to those skilled in the art. It is also contemplated that the computer 800 might not include all the components shown in FIG. 8, can include other components that are not explicitly shown in FIG. 8, or might utilize an architecture completely different than that shown in FIG. 8.

Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computing device, comprising:
   a processor; and
   a hardware root of trust (HRoT) configured to
      determine if a lock status of the computing device is locked,
      responsive to determining the lock status of the computing device is locked,
         pause booting of the computing device,
         determining if a request has been received to unlock the computing device, and
         responsive to determining that a request has been received to unlock the computing device,
            generate an encrypted one-time password by encrypting a one-time password using a symmetric key,
            provide the encrypted one-time password to a registration server,
            receive a decrypted one-time password generated by the registration server, and
            set the lock status of the computing device to unlocked responsive to determining that the one-time password and the decrypted one-time password are identical, wherein the HRoT allows the computing device to boot when the lock status of the computing device is unlocked.

2. The computing device of claim 1, wherein the request to unlock the computing device is received at the HRoT by way of a firmware setup user interface.

3. The computing device of claim 1, wherein the request to unlock the computing device is received at the HRoT by way of a baseboard management controller (BMC) communicatively coupled to the HRoT.

4. The computing device of claim 1, wherein the HRoT generates the symmetric key based, at least in part, on the public key associated with the registration server and a private key associated with the computing device.

5. The computing device of claim 1, wherein booting of the computing device comprises executing a host firmware and a baseboard management controller (BMC) firmware, and wherein pausing booting of the computing device comprises pausing execution of the host firmware and the BMC firmware by way of the HRoT.

6. The computing device of claim 5, wherein the HRoT pauses execution of the host firmware and the BMC firmware at locations defined by a policy.

7. The computing device of claim 6, wherein the HRoT initiates one or more corrective actions responsive to determining that the host firmware or the BMC firmware have executed beyond the locations defined by the policy.

8. A computer-implemented method, comprising:
prior to transit of a computing device,
receiving a public key associated with a registration server at a hardware root of trust (HRoT) of the computing device,
transmitting a public key associated with the computing device from the HRoT to the registration server, and
setting a lock status of the computing device to locked, wherein the HRoT prevents the computing device from booting when the lock status of the computing device is locked; and
following transit of the computing device,
determining following power on of the computing device if the lock status of the computing device is locked,
responsive to determining the lock status of the computing device is locked,
pause booting of the computing device by way of the HRoT,
determining if a request has been received at the HRoT to unlock the computing device, and
responsive to determining that a request has been received at the HRoT to unlock the computing device,
generating an encrypted one-time password, by way of the HRoT, by encrypting a one-time password using a symmetric key,
providing the encrypted one-time password to the registration server,
receiving a decrypted one-time password generated by the registration server at the HRoT, and
setting the lock status of the computing device to unlocked responsive to determining, by way of the HRoT, that the one-time password and the decrypted one-time password are identical, wherein the HRoT allows the computing device to boot when the lock status of the computing device is unlocked.

9. The computer-implemented method of claim 8, wherein the request to unlock the computing device is received at the HRoT by way of a firmware setup user interface.

10. The computer-implemented method of claim 8, wherein the request to unlock the computing device is received at the HRoT by way of a baseboard management controller (BMC) communicatively coupled to the HRoT.

11. The computer-implemented method of claim 8, wherein the HRoT generates the symmetric key based, at least in part, on the public key associated with the registration server and a private key associated with the computing device.

12. The computer-implemented method of claim 8, wherein booting of the computing device comprises executing a host firmware and a baseboard management controller (BMC) firmware, and wherein pausing booting of the computing device by way of the HRoT comprises pausing execution of the host firmware and the BMC firmware by way of the HRoT.

13. The computer-implemented method of claim 12, wherein the HRoT pauses execution of the host firmware and the BMC firmware at locations defined by a policy.

14. The computer-implemented method of claim 13, wherein the HRoT initiates one or more corrective actions responsive to determining that the host firmware or the BMC firmware have executed beyond the locations defined by the policy.

15. A hardware root of trust (HRoT), configured to:
determine if a lock status of a computing device is locked;
responsive to determining the lock status of the computing device is locked, pause booting of the computing device;
determine if a request has been received to unlock the computing device; and
responsive to determining that a request has been received to unlock the computing device,
generate an encrypted one-time password by encrypting a one-time password using a symmetric key,
provide the encrypted one-time password to a registration server,
receive a decrypted one-time password generated by the registration server, and
set the lock status of the computing device to unlocked responsive to determining that the one-time password and the decrypted one-time password are identical, wherein the HRoT permits the computing device to boot when the lock status of the computing device is unlocked.

16. The HRoT of claim 15, wherein the HRoT receives the request to unlock the computing device by way of a firmware setup user interface.

17. The HRoT of claim 15, wherein the HRoT receives the request to unlock the computing device by way of a baseboard management controller (BMC) communicatively coupled to the HRoT.

18. The HRoT of claim 15, wherein booting of the computing device comprises executing a host firmware and a baseboard management controller (BMC) firmware, and wherein pausing booting of the computing device comprises pausing execution of the host firmware and the BMC firmware by way of the HRoT.

19. The HRoT of claim 18, wherein the HRoT pauses execution of the host firmware and the BMC firmware at locations defined by a policy.

20. The HRoT of claim 19, further configured to initiate one or more corrective actions responsive to determining that the host firmware or the BMC firmware have executed beyond the locations defined by the policy.

* * * * *